US005580065A

United States Patent [19]
Ueta

[11] Patent Number: 5,580,065
[45] Date of Patent: Dec. 3, 1996

[54] METALLIC GASKET WITH INWARDLY PROJECTING FOLDED END PORTION

[75] Inventor: Kosaku Ueta, Kumagaya, Japan

[73] Assignee: Japan Metal Gasket Co., Ltd., Japan

[21] Appl. No.: 505,567

[22] Filed: Jul. 21, 1995

[30] Foreign Application Priority Data

Jan. 25, 1995 [JP] Japan ................................ 7-010017
Mar. 3, 1995 [JP] Japan ................................ 7-043923

[51] Int. Cl.⁶ .................................................. F16J 15/08
[52] U.S. Cl. ......................................... 277/180; 277/235 B
[58] Field of Search ............................... 277/180, 235 B, 277/236

[56] References Cited

U.S. PATENT DOCUMENTS

| | | |
|---|---|---|
| 4,799,695 | 1/1989 | Yoshino . |
| 4,836,562 | 6/1989 | Yoshino ............................. 277/235 B |
| 5,029,504 | 5/1993 | Udagawa et al. .................. 277/235 B |
| 5,094,468 | 3/1992 | Hieble ................................ 277/235 B |
| 5,213,345 | 5/1993 | Udagawa ............................ 277/235 B |
| 5,286,039 | 2/1994 | Kawaguchi et al. ............... 277/235 B |
| 5,451,063 | 9/1995 | Udagawa et al. .................. 277/235 B |

FOREIGN PATENT DOCUMENTS

| | | |
|---|---|---|
| 406730 | 1/1991 | European Pat. Off. ........... 277/235 B |
| 633396 | 1/1995 | European Pat. Off. ........... 277/235 B |
| 62-155376 | 7/1987 | Japan . |
| 15372 | 1/1992 | Japan ................................ 277/235 B |
| 416026 | 4/1992 | Japan . |
| 5256370 | 10/1993 | Japan . |

*Primary Examiner*—Scott Cummings
*Attorney, Agent, or Firm*—Young & Basile, P.C.

[57] ABSTRACT

A metallic gasket includes two base plates and a subplate interposed between the base plates, and cylinder bore holes are formed respectively in the base plates and the subplate concentrically. Beads are respectively formed on the base plates circumferentially along a periphery of the cylinder bore hole. An inner edge of the subplate facing the cylinder bore hole is folded back to form a folded section having two layers, and a starting point of a substantially round-shaped folded end portion of the folded section of the subplate is positioned on a line perpendicular to a surface of the gasket, which line passes through ends of the base plates defining the cylinder bore hole, or the starting point of the folded end portion of the folded section of the subplate is positioned slightly at an inside towards the cylinder bore hole beyond the ends of the ends of the base plates. As a result, the folded end portion of the subplate protrudes beyond the ends of the base plates.

13 Claims, 8 Drawing Sheets

PRIOR ART

METALLIC GASKET WITH INWARDLY PROJECTING FOLDED END PORTION

BACKGROUND OF THE INVENTION

1. Field of the Invention

The present invention relates to a metallic gasket which is interposed between joining surfaces of a cylinder block and a cylinder head of an internal combustion engine, and which prevents leakage of fluid such as combustion gas, cooling water, lubricating oil, and the like.

2. Description of the Prior Art

Generally, a gasket of various kinds is interposed between joining surfaces of a cylinder block and a cylinder head mounted thereon of an automobile engine such as an internal combustion engine to prevent leakage of fluid such as combustion gas, cooling water, lubricating oil, and the like, and the sealing function is achieved by tightening both the cylinder block and the cylinder head by tightening members such as bolts or the like. Conventionally, as such a gasket, the so-called soft gasket is provided which is formed of an asbestos material, a chemical fiber material, a carbon sheet material, or the like. However, the soft gasket involves a drawback as an inavoidable problem due its material that there is a deterioration with time due the operation of an internal combustion engine, and that it is difficult to ensure a heat resistance. As a result, is well known that recently, metallic gaskets are widely used, which are excellent in heat resistance, compressive resistance, and durability, and which provide satisfactory restoration properties (spring characteristics) and thermal conductivity.

In such metallic gaskets, the sealing in a peripheral portion of the combustion chamber, that is, the cylinder bore is particularly important. In other words, when the sealing of this portion is not sufficient, the utilization of the combustion gas in the inside of the combustion chamber is incomplete, and it will result in a reduction of the pressure. Accordingly, an elastic base plate in the metallic gasket is provided with a bead formed concentrically with a cylinder bore hole which is formed to communicate with the cylinder bore, and the surface pressure generated between the joining surfaces of the metallic gasket and the cylinder block, and of the metallic gasket and the cylinder head is made to increase by utilizing a repulsive force which is generated when the metallic gasket is tightened by the tightening members such as the bolts between the cylinder block and the cylinder head, thereby to improve the sealing in the peripheral portion of the cylinder bore.

The bead is elastically deformed in a direction in which the bead collapses by the surface pressure when the metallic gasket is tightened by the tightening members such as the bolts between the cylinder block and the cylinder head, however, in order to completely collapse or flatten the bead, a relatively large load is needed. However, between the joining surfaces between the cylinder block and the cylinder head, the tightening force is large at a position near the tightening member such as the bolt, however, the tightening force is inevitably decreased at a remote position. This is resulted from the fact that when an aluminum alloy having low rigidity is used as a material of the cylinder head to decrease the weight of the engine, or when a width of the cylinder head between the combustion chambers is reduced by reducing a distance between combustion chambers to make the engine small in size and light in weight, the rigidity of a portion between the combustion chambers of the engine is reduced.

On the other hand, the bead is formed at a position remote from the position of the tightening member such as the bolt. Accordingly, due to the distance from the tightening member such as the bolt and the above-mentioned reduction of the rigidity of the engine, the bead does not completely collapse by the surface pressure, and an inclination is caused in the bead. More specifically, at a portion at which the bead is formed, the rigidity of the engine and the repulsive force of the bead are balanced, and this balance is maintained when the engine is stopping. However, when the engine is operating, due to an increase and a decrease of the pressure inside the combustion chamber, the tightening force imparted to the metallic gasket is changed, and vibrations are generated in the bead. Furthermore, as a result of vibrations due to a mass of the engine, and as a result of a change in volume due to a temperature change of each engine component, variations are caused in the tightening force imparted to the metallic gasket. Thus, the bead is vibrated by its elasticity due to the above-mentioned vibrations and the variations in the tightening force, and furthermore, there is a possibility of causing a fatigue break when the bending of the bead is repeated due to the vibrations.

Accordingly, there is a proposal to restrict the magnitude of an amplitude of the above-mentioned vibrations and to prevent the occurrence of the fatigue break at the portion of the bead, as disclosed, for example, in Japanese Utility-Model Publication Hei No. 4-16026, and Japanese Patent Publication Hei No. 5-61503.

Specifically, in Japanese Utility-Model Publication Hei No. 4-16026, as shown in FIG. 10, a subplate 3 is placed over a base plate 1 on a side to which a bead 2 expands, that is, the side of a convex of the bead 2, and the base plate 1 and the subplate 3 are coupled with each other by spot welding or by using eylets at several positions including these portions (for example, 10a in FIG. 9 which will be described later) which extend outwardly beyond a joining area with the cylinder block and the cylinder head of the engine. Furthermore, an edge of the subplate 3 is folded back to the base plate 1 side to form a folded section 3a, and this folded section 3a is positioned at an inner side towards the combustion chamber with respect to a starting point or turning point 2a of the bead 2, which starting point 2a is located near the combustion chamber, so that the folded section 3a and the starting point 2a do not overlap with each other. In such a metallic gasket, by the formation of the folded section 3a, the complete collapse of the bead 2 in a collapsing direction is prevented, and at the same time, the deterioration of the restoration property (spring characteristic) is prevented, thereby to decrease the amplitude of the vibrations and to prevent the occurrence of the fatigue break.

On the other hand, in Japanese Patent Publication Hei No. 5-61503, as shown in FIG. 11, a subplate 3' is placed over a base plate 1 at a side at which a bead 2 does not expand, that is, at a concave side of the bead 2, and the base plate 1 and the subplate 3' are coupled with each other at several positions including these portions which extend outwardly beyond a joining area with the cylinder block and the cylinder head in a similar manner as described with reference to FIG. 10. Furthermore, an edge of the subplate 3' is folded back upwardly to hold a flat portion la of the base plate 1 by the folded edge portion of the subplate 3', thereby to form laminations. In this structure, at the laminated end portion, a thickness is increased by one sheet of plate thickness of the subplate 3' as compared with other part of the base plate 1. As a result, a high surface pressure can be ensured at this laminated end portion. Furthermore, by virtue of the structure, a high pressure gas generated in the combustion chamber during operation of the engine is initially sealed (primary sealing) at the laminated end portion, and further, the high pressure gas is secondary sealed by collapsing the bead 2 in the collapsing direction. Accordingly, even when the tightening force of the metallic gasket is varied and the vibrations of the bead are caused, the deformation of the bead 2 in the collapsing direction is restricted by the end portion which is folded, and the vibrations are reduced and the occurrence of the fatigue break is prevented.

However, the metallic gaskets in the prior art involve the following drawbacks.

Specifically, in the metallic gasket in Japanese Utility Model Publication Hei No. 4-16026, the base plate 1 and the subplate 3 are coupled with each other only at several positions at the portions extended outwardly beyond the joining area with the cylinder block and the cylinder head. Accordingly, in the case where the subplate 3 is thin, for example, when the cylinder block of the engine is made of cast iron and the cylinder head is made of aluminum, and when the engine is operated and stopped to repeat a temperature rise and fall in the combustion chamber, there is a possibility that the subplate 3 which is thiner than the base plate 1 is deformed or produces a wrinkle, so that the subplate 3 protrudes into the combustion chamber, or a crack is caused in the folded section 3a. On the other hand, when the subplate 3 is thick, a folded end of the subplate 3 does not become completely flat, or the folded end will somewhat expand to both sides towards the joining surfaces. As a result, the folded end is difficult to be completely flattened even by the tightening force of the tightening members such as bolts, and the folded end will be subjected to a large load at its upper and lower ends in the thickness direction of the subplate 3. Accordingly, a sealing surface of the cylinder block or the cylinder head will sink or become hollow at a peripheral portion of the combustion chamber, and on the other hand, when an enormous load is applied to completely flatten the folded end, there is a possibility that the folded end is broken.

Also, in the metallic gasket in Japanese Patent Publication Hei No. 5-61503, since the base plate 1 and the subplate 3' are coupled with each other only at several positions outside the joining surface area, and since the folded section 3a' is directly in contact with the joining surface of the cylinder block or the cylinder head at the time of assembling the metallic gasket to the engine, when the temperature rise and the temperature fall in the combustion chamber are repeated due to the operation and stopping of the engine as described in the foregoing, the degree of thermal expansion will be different when the engine components are made of different kind of materials, there is a possibility that the subplate 3' which is thiner than the base plate 1 is deformed, and a wrinkle is caused to extend into the combustion chamber, and a crack is caused in the folded section 3'.

SUMMARY OF THE INVENTION

The present invention overcomes the drawbacks in the prior art, and it is an object to provide a metallic gasket which is capable of preventing the fatigue break due to the influence of vibration amplitude caused by the operation of the engine, and suppressing the deformation, and ensuring the stable and satisfactory sealing for a long period.

In a first aspect of the invention, in a metallic gasket inserted between a cylinder block and a cylinder head of an engine for sealing joining surfaces of the cylinder block and the cylinder head, the metallic gasket including at least one base plate made of an elastic metallic plate having at least a hole for combustion chamber and having a bead formed at a peripheral portion of the hole for combustion chamber, and a subplate placed on the base plate and made of another metallic plate having a hole for combustion chamber registered with the hole for combustion chamber of the base plate, the improvement in which the subplate has a folded portion formed by folding back an edge of the subplate facing the hole for combustion chamber, and an end of the folded portion defining the hole for combustion chamber is positioned at a combustion chamber side beyond an end of the base plate defining the hole for combustion chamber, and the edge of the subplate which has been folded back is positioned at a combustion chamber side as compared with a curve starting point of the bead, which curve starting point is positioned nearer to the hole for combustion chamber than the other curve starting point.

In a second aspect of the invention, the subplate is placed on a side of the base plate, from which side the hole for combustion chamber of the base plate is punched through.

In a third aspect of the invention, the end of the folded portion of the subplate extends circumferentially along a whole circumference of the hole for combustion chamber.

In a fourth aspect of the invention, a piece of substantially rectangular shim plate is held inside of adjacent folded sections of the subplate at a position at which holes for adjacent combustion chambers are near to each other.

In the arrangement in the first aspect, when the metallic gasket is mounted on the engine and tightened, the end portion of the base plate facing the hole for combustion chamber and the folded section of the subplate are uniformly in contact with each other over the whole circumference of the combustion chamber of the engine with the exception of the end portion of the folded section of the subplate (the end portion of the folded section of the subplate is protruding inwardly beyond the end of the base plate). Accordingly, a sufficient tightening surface pressure can be ensured. In particular, even when the engine is composed of a combination of components of different kinds of materials in which the cylinder head is made of aluminum and the cylinder block is made of cast iron so that there is a difference in the thermal expansions caused by temperature changes due to the engine operation and the engine stopping, the positional displacement between the base plate and the subplate is prevented, and the occurrence of a crack in the end portion of the folded section of the subplate, and the generation of a wrinkle in the subplate are prevented. Furthermore, since the end portion of the folded section of the subplate is positioned extending towards the combustion chamber beyond the end portion of the base plate defining the hole for combustion chamber, when the metallic gasket is mounted on the engine and tightened, the end portion of the base plate abuts against a starting point or a base point of the end portion of the folded section of the subplate. As a result, the end portion of the folded section of the subplate achieves the effect of a stopper, and the positional displacement between the base plate and the subplate can be prevented.

In forming a hole in a metallic plate, this is performed in almost all cases by punching and stamping. In the hole formed in this manner, it is well known that a corner edge of the hole at the punching starting side falls or is rounded downwardly in a direction of the punching, and conversely, a corner edge of the hole at the punching finishing side protrudes or expands on the surface of the metallic plate in the direction of the punching. The second aspect of the invention is based on this fact. Thus, by placing the subplate on the punching starting side of the base plate, the end portion of the folded section of the subplate and the fallen or rounded corner edge of the base plate hole are closely engaged with each other and more stabled holding of the subplate can be achieved.

In the third aspect of the invention, the end portion of the folded section of the subplate extends circumferentially along the whole circumference of the hole for combustion chamber. As a result, when the metallic gasket is mounted on the engine and tightened, the end portion of the base plate abuts against the starting point of the end portion of the folded section of the subplate, and the stopper effect of the end portion of the folded section is achieved more reliably, and the positional displacement between the base plate and the subplate is prevented more reliably.

In the fourth aspect of the invention, in the case where the rigidity of the cylinder block and the cylinder head is small, at a portion at which holes for combustion chambers are adjacent to each other, the surface pressure produced when the cylinder block and the cylinder head are tightened by the tightening members such as bolts is reduced. However, by virtue of the piece of substantially rectangular shim plate which is held inside the folded sections of the adjacent folded sections of the subplate, the surface pressure is made uniform.

DESCRIPTION OF THE PREFERRED EMBODIMENTS

Figure 7A:
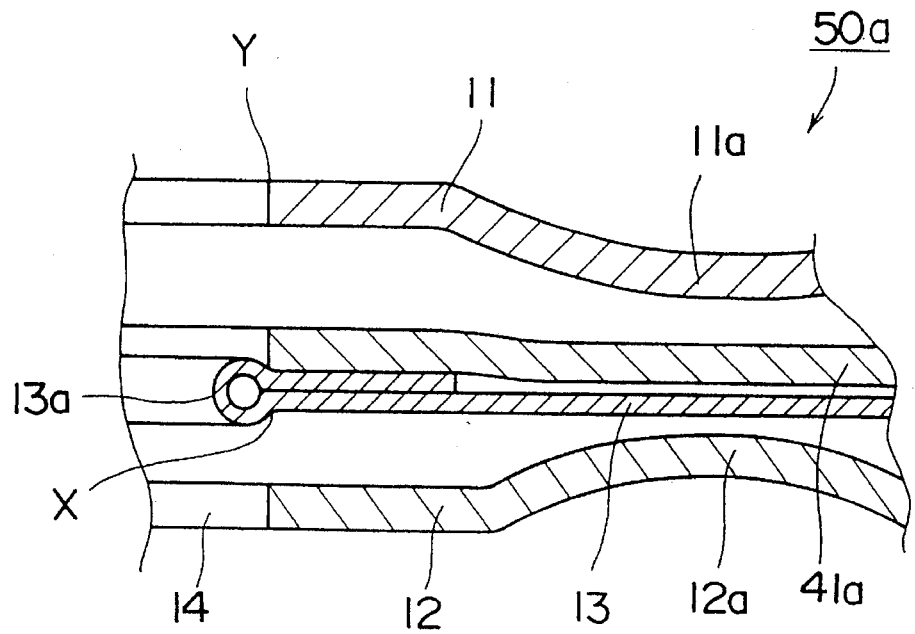
FIGS. 7A and 7B are sectional views of metallic gaskets of respectively still another embodiments in the present invention.
Figure 7B:
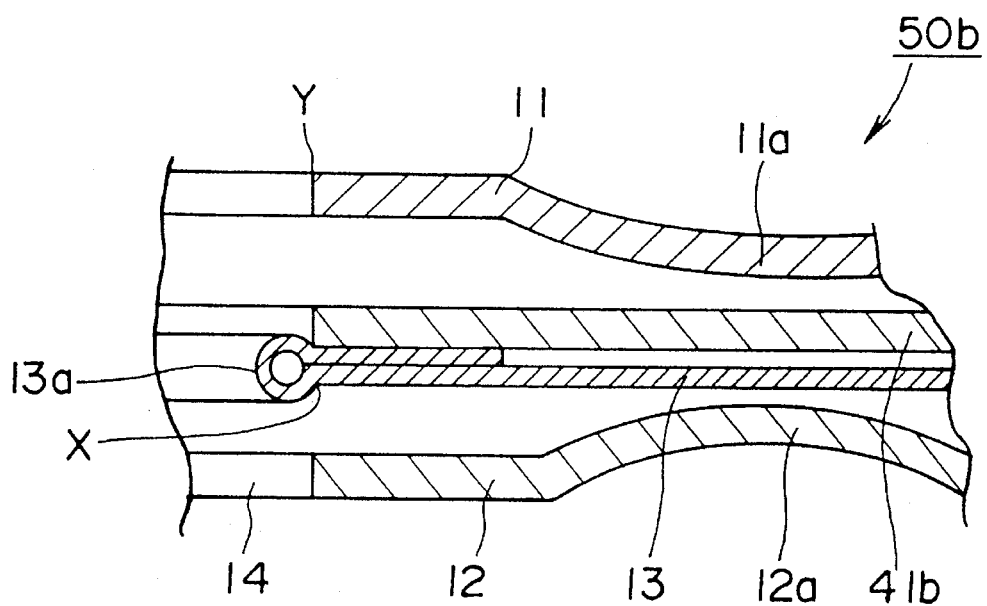
Figure 8A:
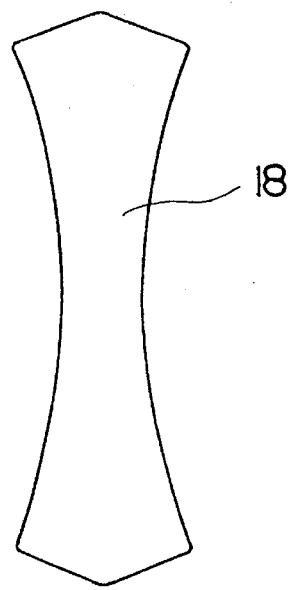
FIG. 8A is a plan view of a piece of substantially rectangular shim plate in still another embodiment.
Figure 8B:
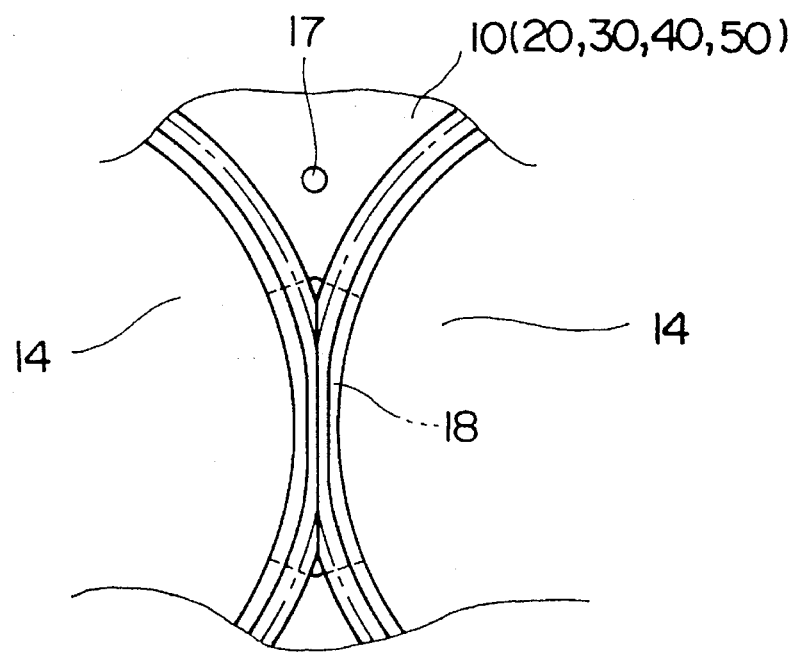
FIG. 8B is an enlarged plan view of a part between adjacent two cylinder bores in which the shim plate in FIG. 8A is held inside a folded sections of a subplate the metallic gasket in any one of the above-mentioned embodiments.
Figure 9:
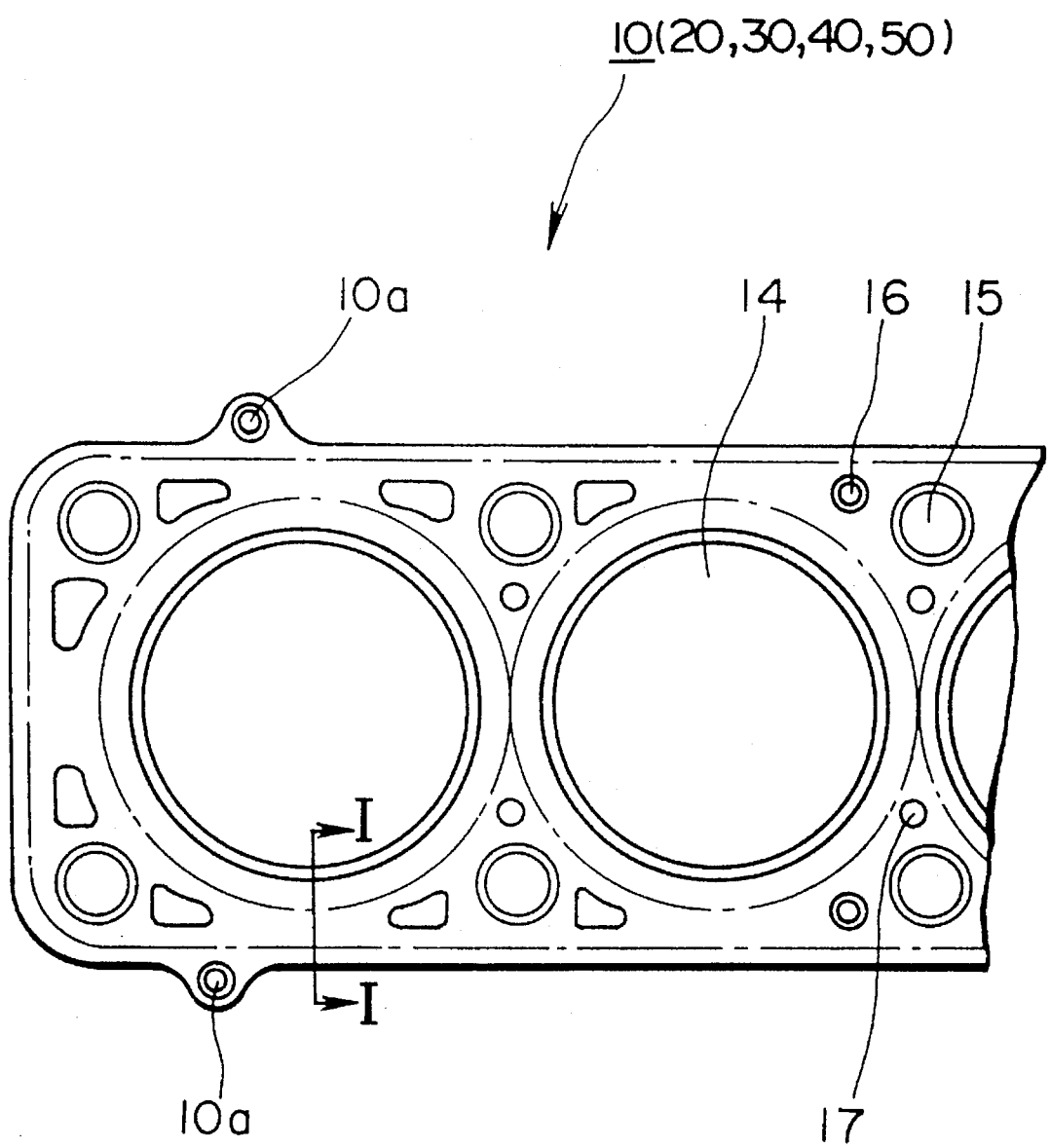
FIG. 9 is a plan view of the metallic gasket in any one of the above-mentioned embodiments.
Figure 10:
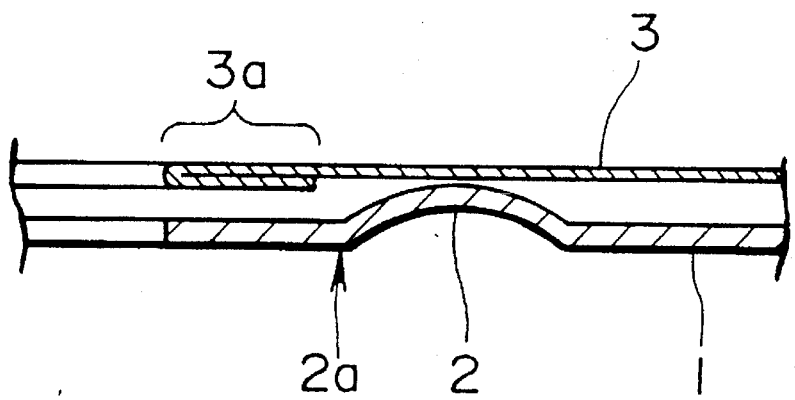
FIG. 10 is a sectional view of a prior art metallic gasket.
Figure 11:
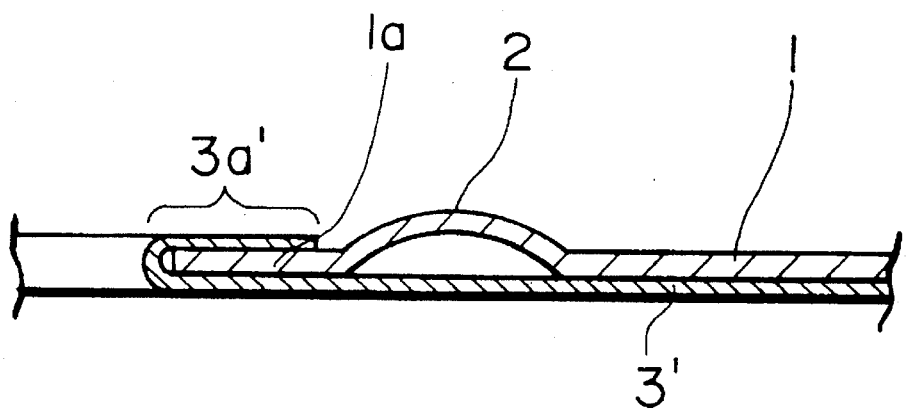
FIG. 11 is a sectional view of another prior art metallic gasket.

FIGS. 1 to 9 show embodiments of the present invention. In these figures, FIG. 9 is a plan view of a metallic gasket 10, and FIG. 1A is a sectional view taken along the line I—I in FIG. 9. As shown in these figures, the metallic gasket 10 includes two base plates 11 and 12 made of an elastic metallic plate such as stainless steel or the like, and a subplate 13 sandwiched between the base plates 11 and 12 and made of a metallic plate thiner than the base plates. These base plates 11 and 12 and subplate 13 are coupled with one another by spot welding or by using eyelets at several positions at portions 10a or the like which extend outwardly from a joining area of a cylinder block and a cylinder head of an engine. Each of these base plates 11 and 12 and subplate 13 has various holes of concentric circles as will be described later. The base plates 11 and 12 may be coated with a micro-sealing agent or the like on their surfaces to compensate for the roughness of the joining surfaces of the cylinder block and the cylinder head.

The various holes mentioned above include a plurality of cylinder bore holes 14 corresponding to cylinder bores (combustion chambers) of the cylinder block, bolt holes 15 for tightening bolts which couple the cylinder block and the cylinder head with each other, oil holes 16 for oil galleries which supply lubricating oil to each sliding portions of a piston or the like not shown, and water holes 17 positioned corresponding to the inside of a water jacket which supplies cooling water to the cylinder block and the cylinder head whose temperature rises due to the combustion of fuel and the sliding movement of the piston. These holes 14 to 17 are communicated with corresponding portions when the metallic gasket 10 is interposed between the cylinder block and the cylinder head to assemble the engine.

Figure 1A:
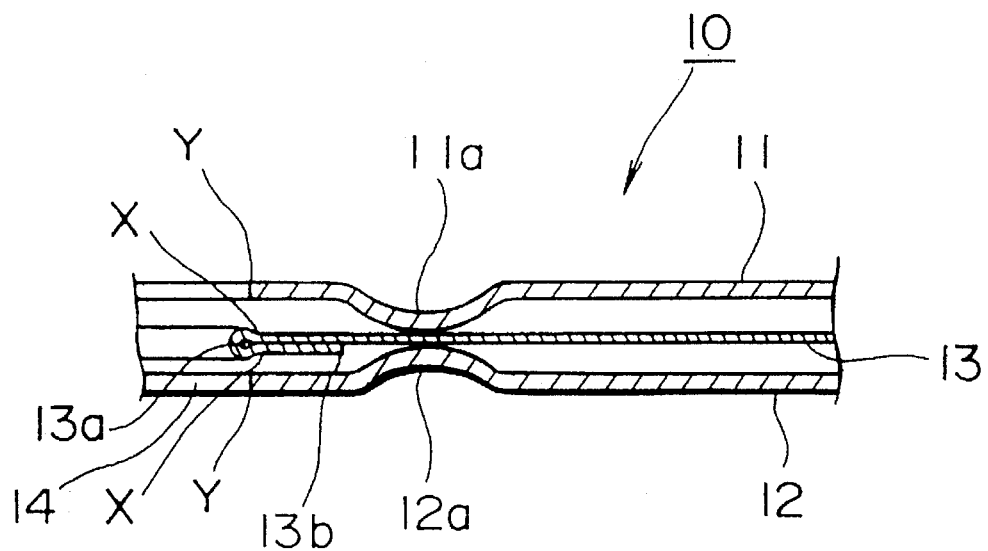
FIG. 1A is a sectional view of a metallic gasket of one embodiment in the present invention.

With reference to FIG. 1A, the upper base plate 11 has a bead 11a formed at a peripheral portion of the cylinder bore hole 14, and the bead 11a is formed by expanding a part of the base plate 11 downwardly to curve in an arc shape as that a so-called full bead is formed. Furthermore, the lower base plate 12 also has a bead 12a which is formed in a similar manner, however, in this case, the bead 12a is formed by expanding a part of the base plate 12 upwardly so that the beads 11a and 12a formed on the base plates 11 and 12 oppose to each other with their convex sides interposed by the subplate 13. Furthermore, although the beads 11a and 12a are formed concentricaly with respect of the center of the cylinder bore bore 14 with the same radius, the radii may be different, and the widths of the beads 11a and 12a may be different.

The ends of the base plates 11 an 12, which define the cylinder bore hole 14 are positioned at the same position, that is, aligned vertically. The subplate 13 has a folded section which is formed by folding back an edge portion positioned at the cylinder bore hole 14 side to the side of the lower base plate 12. That is, the folded edge portion and an opposing portion of the subplate 13 form the folded section consisting of two layers, or laminated layers. An edge 13b of the folded section which was positioned at an inner peripheral edge of the subplate 13 before forming the folded section and now positioned opposite to an end portion 13a of the folded section defining the cylinder bore hole 14, is positioned at an inner side or towards the cylinder bore hole 14 with respect to starting points or turning points of the beads 11a and 12a, which are positioned at the side of the cylinder bore hole 14 as compared with the other starting points of the beads. As a result, the folded section does not overlap with the beads 11a and 12a.

In forming the folded section (between the end portion 13a and the edge 13b), the end portion 13a defining the cylinder bore hole 14 is not completely flat in most cases. In other words, the end portion 13a expands somewhat above and below the upper surface and the lower surface of laminated layers, that is, the folded section of the subplate 13. This is inavoidable in forming the folded section with the metallic plate, and in order to collapse and flatten the end portion 13a having a substantially circular cross section, an excessively large load will be necessary. In addition, if the excessively large load is applied to the end portion 13a, there is a possibility of causing a crack and a break in the end portion 13a. In this respect, it has been confirmed that it is very difficult to collapse and flatten the end portion if the plate thickness is equal to 0.3 mm or larger.

Accordingly, in this metallic gasket 10, the end portion 13a of the folded section is formed so that a position X of a starting point or a base point of the end potion 13a is on the same perpendicular line which is perpendicular to the surface of the metallic gasket 10 and which passes through the ends Y and Y of the upper and lower base plates 11 and 12, or the starting point X of the end portion 13a is positioned somewhat at the inner side of the cylinder bore hole 14 from the perpendicular line, so that the whole end portion 13a protrudes into the cylinder bore hole 14 beyond the ends Y and Y of the upper and lower base plates 11 and 12.

Figure 2:
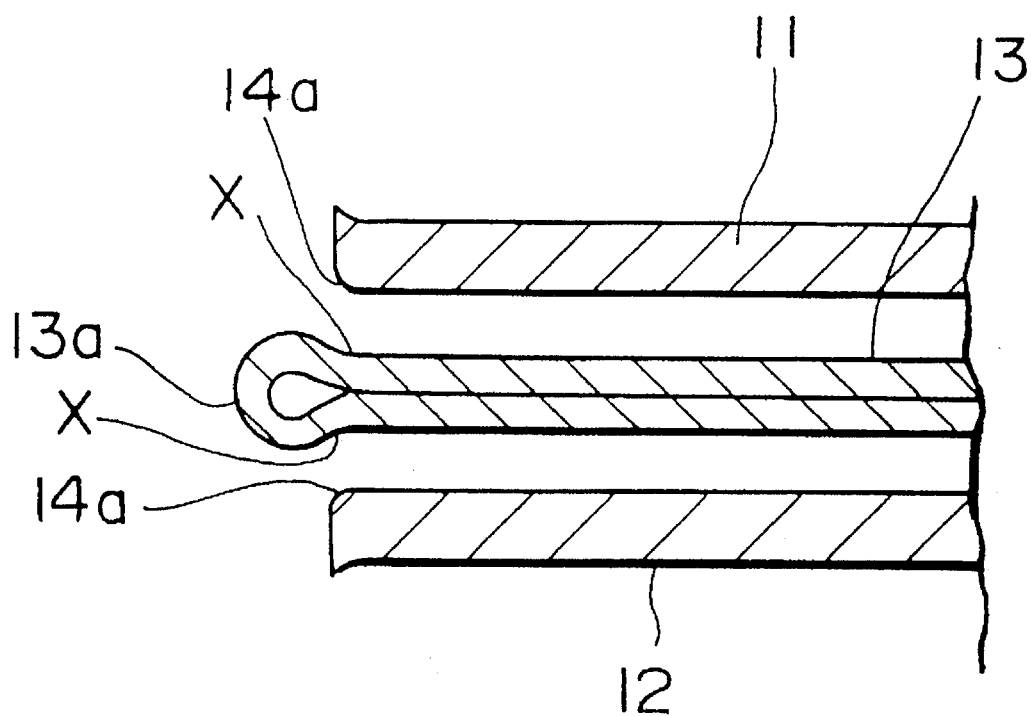
FIG. 2 is a detailed sectional view of a part of the metallic gasket in FIG. 1A.

Furthermore, in forming a hole in a metallic plate, this is performed in almost all cases by punching and stamping. In the hole formed in this manner, a phenomenon occurs in which a corner edge of the hole at the punching starting side falls or is rounded downwardly in the direction of punching, and conversely, a corner edge of the hole at the punching finishing side protrudes or expands on the surface of the metallic plate in the direction of the punching. Taking this fact into consideration, in this metallic gasket 10, as shown in FIG. 2, the subplate 13 is placed at the punching starting side for the cylinder bore 14 of the base plate 11 and also the base plate 12, so that the starting points X and X of the end portion 13a are respectively engaged closely with the falling corner edges 14a and 14a of the base plates 11 and 12.

Next, the function of the metallic gasket 10 arranged as mentioned above will be described.

Figure 1B:
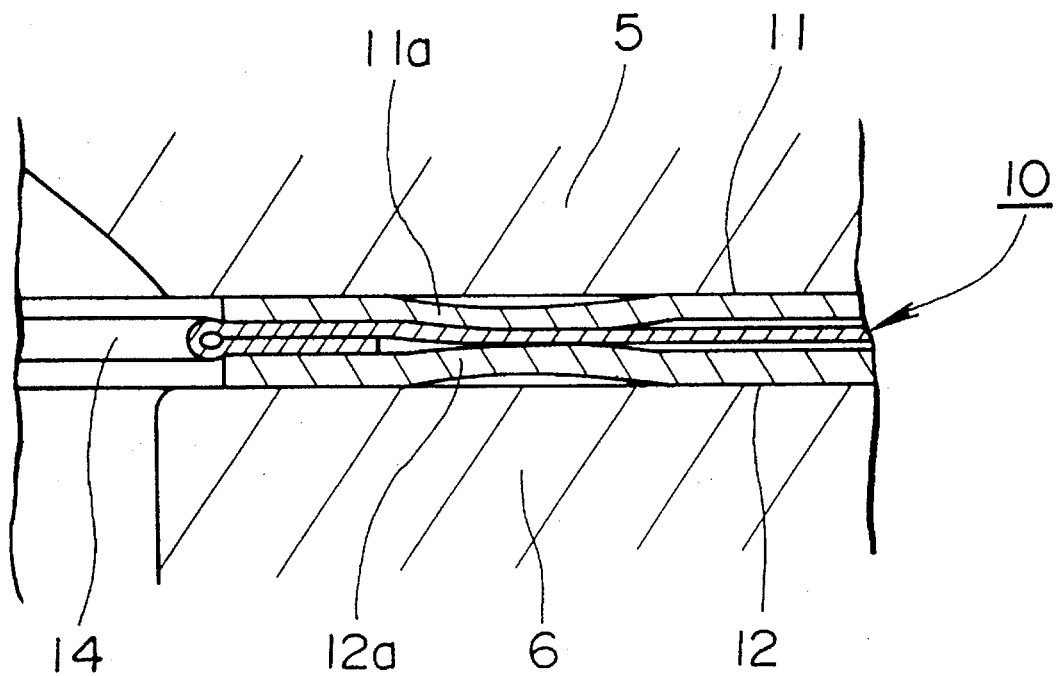
FIG. 1B is a sectional view of a state in which the metallic gasket in FIG. 1A is assembled to an engine.

As shown in FIG. 1B, the metallic gasket 10 is interposed between joining surfaces of the cylinder block 6 and the cylinder head 5 of the engine. When the cylinder head 5 is tightened against the cylinder block 6 with tightening members such as bolts, the metallic gasket 10 is deformed in the collapsing direction, and in particular, when the beads 11a and 12a are collapsed and elastically deformed, the metallic gasket 10 is brought into contact pressure with joining surfaces of the cylinder block 6 and the cylinder head 5 by its own elastic restoring force, there by to seal the joining surfaces.

In this case, even when the folded section of the subplate 13 is brought into contact with a lower surface of the base plate 11 and with an upper surface of the base plate 12 due to the deformation, the end portion 13a of the folded section of the subplate 13 protrudes towards the cylinder bore hole 14 from the contact surfaces of the base plates 11 and 12 with the folded section of the subplate 13, so that the end portion 13a does not contact with any of the joining surfaces of the cylinder block 6 and the cylinder head 5. Thus, the end portion 13a is located in a space defined between joining surfaces of the cylinder block 6 and the cylinder head 5 and defined by an inner peripheral surface of the cylinder bore hole 14 having a thickness corresponding to the sum of thicknesses of the base plates 11 and 12 and the folded section of the subplate 13. Accordingly, the end portions of the base plates 11 and 12 and the folded section of the subplate 13 are uniformly in contact with the sealing surfaces of the cylinder block 6 and the cylinder head 5 along the whole circumference of the inner peripheral surface of the cylinder bore hole 14. Moreover the starting points X and X of the end portion 13a abut against the falling corner edges 14a and 14a of the cylinder bore holes 14 of the base plates 11 and 12. As a result, the end portion 13a of the folded section of the subplate 13 performs the function of a stopper and the positional displacement of the base plates 11 and 12 towards the inside of the cylinder bore hole 14 is prevented.

By virtue of the arrangement, in the engine composed of a combination of components of different materials, for example, the cylinder block 6 is made of cast iron and the cylinder head 5 is made of aluminum, even when a difference in thermal expansion is caused between the cylinder block 6 and the cylinder head 5 due to a temperature change in the combustion chamber during operation of the engine, positional displacements of the base plates 11 and 12 and the subplate 13 do not occur. Furthermore, the occurrence of a crack in the end portion 13a of the folded section, the generation of a wrinkle due to the displacements, and the positional displacement and deformation of the folded section can be prevented.

In the foregoing, the metallic gasket 10 as shown in FIGS. 1A and 1B is described. However, it is of course possible to arrange various kinds of metallic gaskets other than that shown in FIGS. 1A and 1B. For example, when it is desirable to increase a thickness of the gasket, a shim plate 41' is added as shown in FIGS. 7A and 7B. These examples will be described with reference to FIGS. 3 to 6.

Figure 3A:
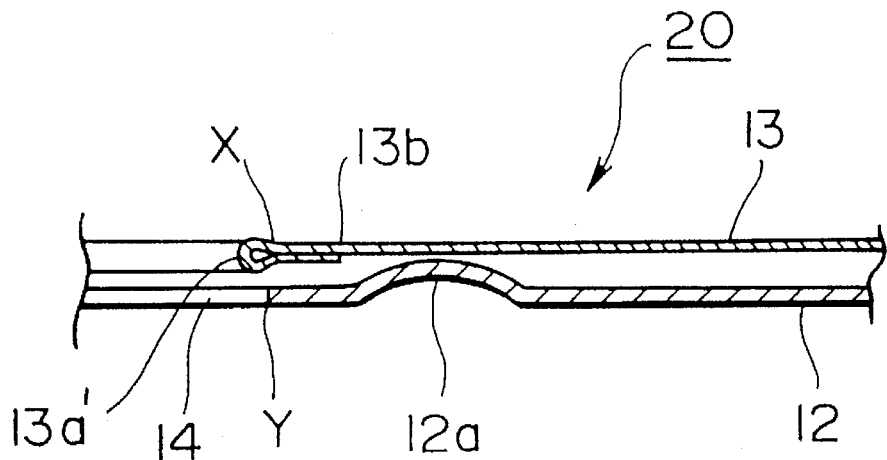
FIG. 3A is a sectional view of a metallic gasket of another embodiment in the present invention.

A metallic gasket 20 as shown in FIGS. 3A includes a single base plate 12 and a subplate 13, as compared with the previously-described metallic gasket 10 including two base plates 11 and 12 and the subplate 13. Accordingly, the arrangement of the metallic gasket 20 is substantially the same to that of the metallic gasket 10 with the exception of the base plate 11. However, in the metallic gasket 20, an end portion 13a' of folded section of the subplate 13 is expanded to only the side of the base plate 12.

Figure 3B:
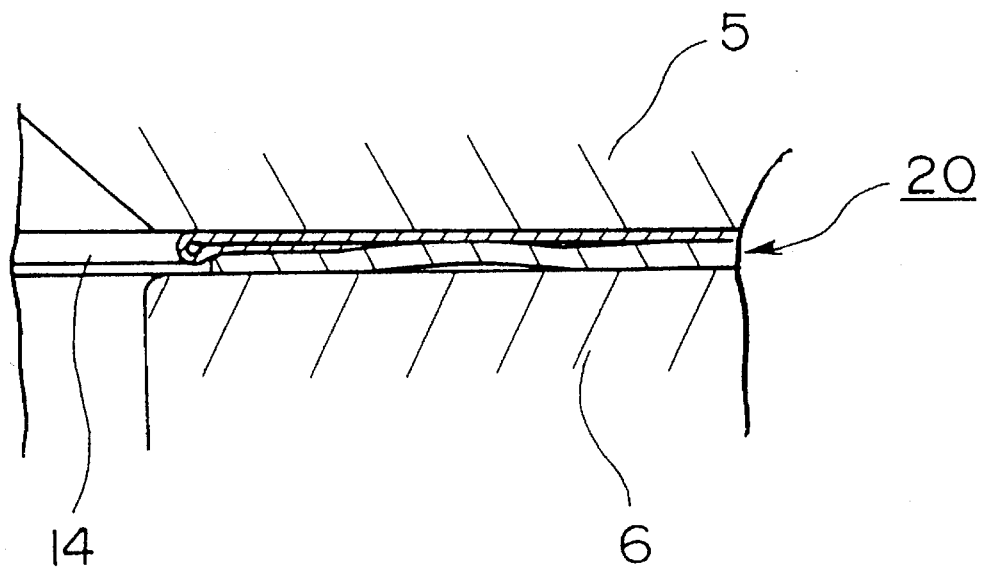
FIG. 3B is a sectional view of a state in which the metallic gasket in FIG. 3A is assembled to an engine.

FIG. 3B shows the metallic gasket 20 which is mounted on the engine and tightened. Also, in this case, similar to the previously-described metallic gasket 10, the end portion 13a' of the subplate 13 protrudes inwardly towards a cylinder bore hole 14 from contact surfaces of the folded section of the subplate 13 and the base plate 12 even when an upper surface of the base plate 12 and a lower surface of the folded section of the subplate 13 are in contact with each other due to deformation by tigtening surface pressure. As a result, the end portion 13a' does not contact with any of the joining surfaces of the cylinder block 6 and the cylinder head 5, and the end portion 13a' is positioned in a space between the joining surfaces of the cylinder block 6 and the cylinder head 5 which are separated from each other by a thicknesses of the base plate 12 and the folded section of the subplate 13. AccordinGly, the end portion of the base plate 12 and the folded section of the subplate 13 are uniformly in contact with sealing surfaces of the cylinder block 6 and the cylinder head 5 over the whole peripheral portion of the sealing surfaces. Moreover, since a lower starting point X of the end portion 13a' of folded section of the subplate 13 abuts against a falling corner edge of the cylinder bore hole 14 of the base plate 12, the end portion 13a' of folded section performs the function of a stopper, and the positional displacement of the base plate 12 towards the inside of the cylinder bore 14 is prevented.

Figure 4:
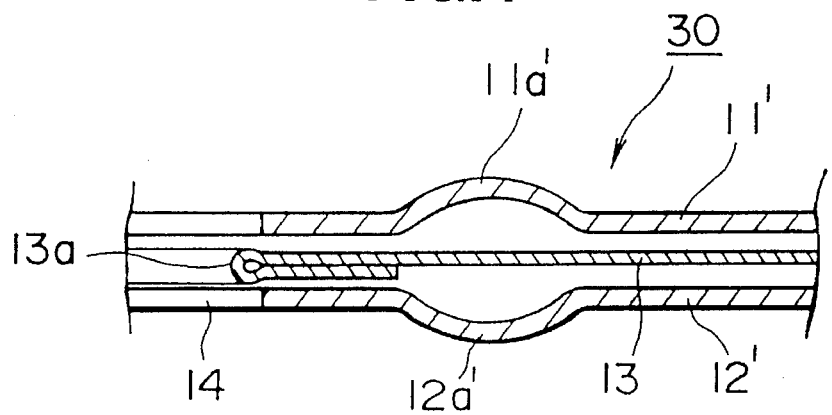
FIG. 4 is a sectional view of a metallic gasket of still another embodiment in the present invention.

In a metallic gasket 30 shown in FIG. 4, as compared with the metallic gasket 10 as shown in FIG. 1A in which the base plates 11 and 12 are disposed interposed by a subplate 13 so that their convex sides of the beads 11a and 12a are opposing each other, base plates 11' and 12' in FIG. 4 are disposed interposed by a subplate 13 with their concave sides of beads 11a' and 12a' are opposing each other.

Figure 5:
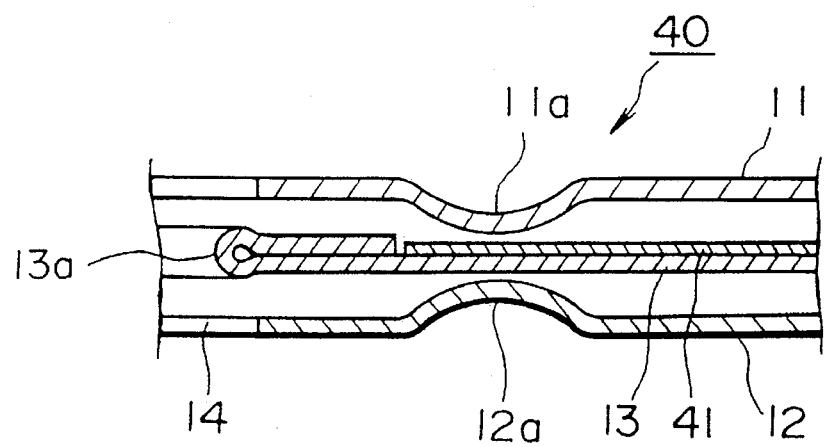
FIG. 5 is a sectional view of a metallic gasket of still another embodiment in the present invention.

Furthermore, in a metallic gasket 40 shown in FIG. 5, in addition to the metallic gasket 10 as shown in FIG. 1A, a shim plate 41 made of a separate thin metallic plate thiner than the thickness of the subplate 13 is placed on a side of the subplate 13, on which side of the subplate 13, a folded section of the subplate 13 is formed so that the folded section does not overlap the shim plate 41.

Furthermore, in metallic gaskets 50a and 50b shown in FIG. 7A and 7B, in contrast to the form of the metallic gasket 40 shown in FIG. 5, an inner edge of a shim plate 41a (or 41b) extends to an upper starting point X of an end portion 13a of folded section of a subplate 13 so that the shim plate 41a (or 41b) covers the folded section of a subplate 13. In this case, the inner edge of a shim plate 41a (or 41b), the upper starting point X of the end portion 13a of folded section of the subplate 13, the edges Y of the cylinder bore hole 14 of the base plates 11 and 12 are positioned on a same perpendicular line to a surface of the gaskets 50a (or 50b). The gasket 50a differs from the gasket 50b in that, in the gasket 50a, the shim plate 41a has a step portion formed in the vicinity of the edge of the folded section of the subplate 13 so that the shim plate 41a is stepped down by a half of a plate thickness of the subplate 13 towards the subplate 13 to narrow an interval between an lower surface of the shim plate 41a and an upper surface of the subplate 13. In contrast, in the gasket 50b, the shim plate 41b has no step portion, and the shim plate 41b extends horizontally in parallel to the subplate 13. In the gasket 50a, the upper surface and the lower surface of the shim plate 41a serve as the stopper by virtue of the step portion, whereas in the gasket 50b, the shim plate 41b is added to adjust the size of the gasket 50b.

Any of the metallic gaskets 30, 40, and 50a and 50b, a similar advantage can be obtained as the aforementioned metallic gasket 10 and 20. In particular, in the metallic gaskets 40, the deformation of the subplate 13 in a surface pressure direction due to the clamping force can be suppressed by the shim plate 41, and further satisfactory sealing property can be ensured.

Figure 6:
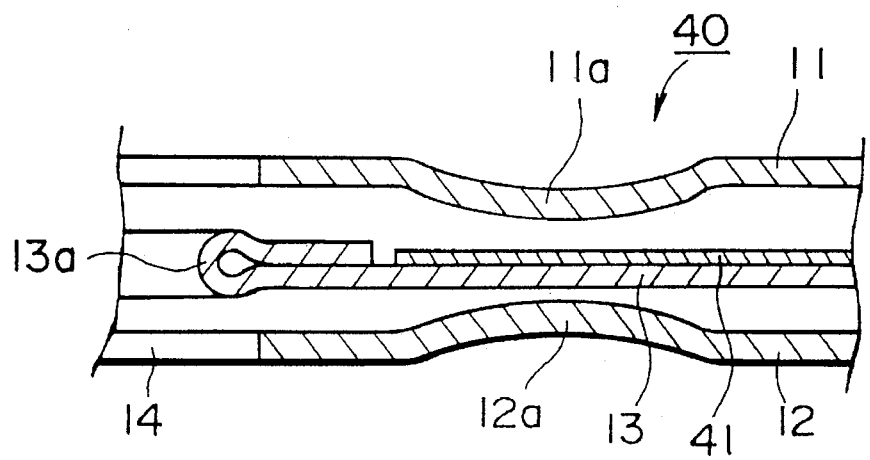
FIG. 6 is a sectional view of a metallic gasket of still another embodiment in the present invention.

Also, in FIG. 6, in the metallic gasket 40, an example is shown in which the thicknesses of the base plates 11, 12, and the subplate 13 are made thick, and the curvature of the beads 11a, 12a is made small (i.e., a height is made low), and a width of the folded section of the subplate 13 is made small. This example, not only the metallic gasket 40 but also applicable to all the other metallic gaskets, is a typical example indicating that a change of the size of the gasket is possible depending on the magnitude of a clamping surface pressure, the nature of engine components, the magnitude of a gas pressure generated within the cylinder bore, or the like.

Furthermore, at a position where adjacent cylinder bore holes 14 and 14 are near to each other, a piece of substantially rectangular shim plate 18 made of a soft metallic material and having a plane shape as shown in FIG. 8A may be held by adjacent folded sections as shown in FIG. 8B. That is, when the rigidity of the cylinder block and the cylinder head is small, at the position where adjacent cylinder bore holes 14 and 14 are near to each other as shown in FIG. 8B, surface pressure is apt to be small when the cylinder block and the cylinder head are clamped with clamping members such as bolts or the like, however, by inserting the shim plate 18 at this position, satisfactory sealing property can be ensured even at a position between the cylinder bores where in particular the clamping surface pressure is low.

As will be apparent from the foregoing descriptions, the metallic gaskets in the present invention provide the following advantages.

A fatigue break due to the effect of vibration amplitude caused by the operation of the engine can be prevented, and suppression of deformation can be achieved so that satisfactory sealing property can be ensured for a long period.

In the first aspect of the present invention, the end portions of the base plates at a periphery of the combustion chamber bore hole are uniformly in contact with the folded section of the subplate over the whole periphery of the combustion chamber, with the exception of the folded end of the subplate. As a result, a sufficient clamping surface pressure can be ensured, and therefore, a positional deviation between the base plates and the subplate is prevented, and cracking of the folded end of the subplate, and generation of wrinkles or the like can be prevented. Furthermore, the edge of each base plate defining the combustion chamber bore hole abuts against the starting point of the folded end of the subplate so that the folded end serves as a stopper, the positional deviation between the base plates and the subplate is further prevented reliably.

In the second aspect of the present invention, the folded end of the subplate and the falling or curved inner edge of the base plate facing the combustion chamber bore hole are enGaGed with in close contact with each other. As a result, the subplate can be held more stably.

In the third aspect of the present invention, the folded end of the subplate functions as a stopper more reliably.

In the fourth aspect of the present invention, the surface pressure at the time of clamping with clamping members such as bolts can be made more uniform.

What is claimed is:

1. An improved metallic gasket inserted between a cylinder block and a cylinder head of an engine for sealing joining surfaces of the cylinder block and the cylinder head, the metallic gasket including at least one base plate made of an elastic metallic plate having at least a hole for a combustion chamber and having a bead formed at a peripheral portion of the hole for the combustion chamber, and a subplate placed on the base plate and made of another metallic plate having a hole for the combustion chamber registered with the hole for the combustion chamber of the base plate, wherein the improvement comprises:

the subplate having a folded section formed by folding back an edge of the subplate facing the hole for the combustion chamber, and an end of the folded section defining the hole for the combustion chamber positioned at a combustion chamber side beyond an end of the base plate defining the hole for the combustion chamber, when the metallic gasket is tightened between the joining surfaces of the cylinder block and the cylinder head, the end portion of the folded section slightly extending upwardly and downwardly relative to respective points of the folded section, wherein the edge of the subplate which has been folded back is positioned at a combustion chamber side as compared with a curve starting point of the bead, which curve starting point is positioned nearer to the hole for the combustion chamber than the other curve starting point of the bead.

2. The metallic gasket according to claim 1, wherein the subplate is placed on a side of the base plate, from which side the hole for the combustion chamber of the base plate is punched therethrough.

3. The metallic gasket according to claim 1, wherein the end of the folded section of the subplate extends along a whole circumference of the hole for the combustion chamber.

4. The metallic gasket according to claim 1, wherein a piece of substantially rectangular shim plate is held by adjacent folded sections at a position at which adjacent holes for the combustion chamber are near to each other.

5. The metallic gasket according to claim 1, wherein a shim plate is placed over the subplate except for the folded end of the folded section so that a lower surface of the shim plate is in contact with an upper surface of the folded section with an inner edge of the shim plate aligned with a folding end starting point of the subplate.

6. The metallic gasket according to claim 5, wherein the shim plate has a step portion at a position of an edge of the folded section of the subplate so that the shim plate is stepped down toward the subplate to narrow an interval between a lower surface of the shim plate and an upper surface of the subplate.

7. The metallic gasket according to claim 2 wherein the end of the folded section of the subplate extends along a whole circumference of the hole for the combustion chamber.

8. The metallic gasket according to claim 7 wherein a piece of substantially rectangular shim plate is held by adjacent folded sections at a position at which adjacent holes for the combustion chamber are near to each other.

9. The metallic gasket according to claim 7 wherein a shim plate is placed over the subplate except for the folded end of the folded section so that a lower surface of the shim plate is in contact with an upper surface of the folded section with an inner edge of the shim plate aligned with a folding end starting point of the subplate.

10. The metallic gasket according to claim 7 wherein the shim plate has a step portion at a position of an edge of the folded section of the subplate so that the shim plate is stepped down toward the subplate to narrow an interval between a lower surface of the shim plate and an upper surface of the subplate.

11. The metallic gasket according to claim 2 wherein a piece of substantially rectangular shim plate is held by adjacent folded sections at a position at which adjacent holes for the combustion chamber are near to each other.

12. The metallic gasket according to claim 2 wherein a shim plate is placed over the subplate except for the folded end of the folded section so that a lower surface of the shim plate is in contact with an upper surface of the folded section with an inner edge of the shim plate aligned with a folding end starting point of the subplate.

13. The metallic gasket according to claim 12 wherein the shim plate has a step portion at a position of an edge of the folded section of the subplate so that the shim plate is stepped down toward the subplate to narrow an interval between a lower surface of the shim plate and an upper surface of the subplate.

* * * * *